Feb. 3, 1970  W. E. BROWN  3,493,263
BULKHEAD FOR TRUCK TRAILER OR TRUCK BED
Filed Oct. 9, 1967

INVENTOR.
WILLIAM E. BROWN
BY
Watts, Hoffmann, Fisher & Heinke
ATTORNEYS.

United States Patent Office 3,493,263
Patented Feb. 3, 1970

3,493,263
BULKHEAD FOR TRUCK TRAILER
OR TRUCK BED
William E. Brown, Kent, Ohio, assignor to
E. J. Miller Trucking Co.
Filed Oct. 9, 1967, Ser. No. 673,723
Int. Cl. B62d 33/00, 33/02
U.S. Cl. 296—28                                    13 Claims A highway truck or trailer bed has, near its forward end, a frame with apertured material mounted thereon forming a bulkhead for inhibiting forward movement of a load.

BACKGROUND OF THE INVENTION

Field of the invention

The present invention relates to bulkheads for the beds of trucks and truck trailers and more particularly to a bulkhead formed of a frame covered with apertured material.

Description of the prior art

With truck and trailer beds especially of the flat type, there is a need for inhibiting a forward shifting load from striking against the cab of the truck or tractor. The possibility that the load may shift past the forward end of the bed presents both a danger to the truck driver and the likelihood of the cab and the load becoming damaged. The problem becomes especially acute where loads carried on the trailer are of bulky materials such as concrete slabs, strip steel, and the like.

Prior proposals for truck bulkheads have all had inherent deficiencies of one kind or another. One such proposal is a shield rigidly mounted on the rear of a cab portion of a truck. A disadvantage of this proposal is that if the truck should be in a turning position or should jackknife so that the cab portion would be at an angle with the load carrying or trailer portion, the load could shift forward off the trailer. Further, the space available for absorbing the force of a shifting load is limited. A further disadvantage is that a shield of adequate size to protect the cab will block the rearward view of the driver and increase the wind resistance of the cab excessively.

Another proposal consists only of various frame members without a substantially continuous surface against which a load can abut. This does not provide a construction in which the force of a shifting load is distributed over the entire frame. Moreover, it is possible for relatively narrow pieces of a load to pass between the frame members.

SUMMARY OF THE INVENTION

The present invention has overcome various shortcomings of prior proposals by providing a novel and improved bulkhead mounted on a bed near its forward end. In a preferred form of the invention, the bulkhead comprises a frame including a horizontally aligned base member and upper member, and spaced, upright side members for defining the barrier area. A body portion of screen-like material, preferably expanded metal, is mounted on the frame. It is also preferable to provide additional members arranged across the barrier area for providing reinforcement and as an aid in positioning the screen-like material.

The arrangement of the present invention has the advantage of being mounted at the forward end of the truck or trailer bed to inhibit forward shifting of a load and prevent its hitting the cab. If the truck should jackknife, the barrier is rigidly connected to the trailer near its forward end to prevent a load from shifting off the trailer. Since the body portion of the bulkhead is formed of a screen-like material, it presents a surface having relatively low wind resistance. In addition, the driver has good visibility to the rear of the truck.

In the preferred form of the present invention, the body portion of the barrier is formed of expanded metal, which is strong yet presents a yieldable surface against which the load material can abut. If the load should shift forward, the load will cause the barrier to yield somewhat upon impact. It is this yieldability feature which reduces breakage or damage to a load as compared with barriers which present a relatively rigid surface with which greater shock is transferred to the load upon impact.

Accordingly, an object of the present invention is to provide a novel and improved bulkhead for a truck or trailer bed having low wind resistance.

Another object of the present invention is to provide a novel and improved bulkhead for a truck or trailer bed which permits good driver visibility to the rear of the vehicle.

Still another object of the present invention is to provide a novel and improved bulkhead for a truck or trailer bed which is yieldable to reduce shock transferred to a load upon impact with the bulkhead.

Yet another and more general object of the present invention is to provide a novel and improved bulkhead for a truck or trailer bed for preventing a load from shifting past the forward end of the bed into engagement with the cab.

Other objects and a fuller understanding of the invention may be had by referring to the following detailed description and claims taken in conjunction with the drawings.

DESCRIPTION OF THE DRAWINGS

Referring to FIGURE 1 of the drawings, a truck is designated generally by the numeral 10 and includes a cab 11 and a load carrying portion or trailer 12 connected behind the cab 11. The trailer 12 is provided with a substantially flat load carrying surface or bed 14 for carrying elongated materials such as cement slabs shown at 16. The trailer 12 is of the open-sided type which requires some form of barrier at the forward end to prevent a forward shifting load from striking the cab 11. The cement slabs 16 are prevented from shifting sideways by chains 18 connected to a metal band 20. The band 20 is fastened to the trailer frame about the periphery of the bed 14.

Referring now to FIGURES 1-3, a preferred form of the present invention is a bulkhead 24 mounted near the forward end of the trailer 12 and extending upwardly therefrom. The bulkhead 24 generally comprises a frame, preferably of steel. The frame includes spaced side members 26, 27 removably mounted in side socket mountings 28, 29 respectively. The side socket mountings 28, 29 are connected to opposite sides of the frame of the bed 14 near the forward end thereof and inside the band 20. A base member 32 having rearwardly extending end portions 33, 34 connected to bottom portions of the side members 26, 27 respectively, is horizontally aligned across the bed 14. A horizontal top member 36 includes rearwardly extending end portions 37, 38 connected between upper end portions of the side members 26, 27 respectively.

Figure 1:
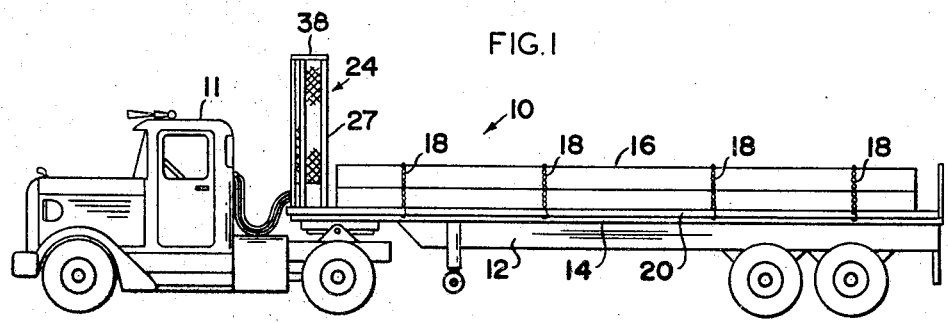
FIGURE 1 is a side elevational view of a highway tractor and trailer having the bulkhead of the present invention mounted near its forward end.
Figures 2, 3:
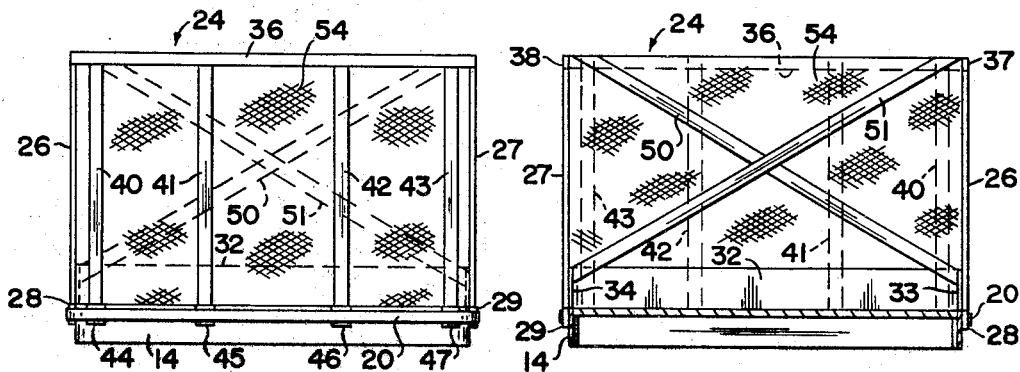
FIGURE 2 is an elevational view, on an enlarged scale with respect to FIGURE 1 of the bulkhead of the present invention as seen from the front end of the trailer.
FIGURE 3 is an elevational view on the scale of FIGURE 2 of the bulkhead of the present invention as seen from the rear of the trailer.

Spaced, upright reinforcement members 40–43 are removably mounted at their bottom ends in front socket mountings 44–47, respectively. The front socket mountings 44–47 are connected between the forward end of the frame of the bed 14 and the band 20. The reinforcement members 44–47 are connected at their upper ends to the top member 36. For added reinforcement, a pair of diagonal reinforcement members 50, 51 are arranged between the base member 32 and the top member 36 at the rear side of the bulkhead 24. The diagonal reinforcement members 50 are arranged in an X-shaped pattern to provide criss-crosses. The reinforcement members 44–47 and the reinforcement members 50, 51 are arranged in substantially parallel planes spaced a short distance from one another.

As described above, the framework of the bulkhead 24 is so arranged that a body portion 54 is positioned in a mounting space between the reinforcement members 40–43 on the one hand and the reinforcement members 50, 51 and base member 32 on the other hand. Side portions of the body portion 54 extend rearwardly toward the side members 26, 27. The body portion 54 is composed of a screen-like material and is preferably expanded metal. A steel mesh known in the trade as expanded metal is chosen as the material for the body portion 54 because of its high strength characteristics and yieldability. This expanded metal is fixed to the various members forming the bulkhead frame so that on impact of a shifting load, the force of the load is distributed over the entire bulkhead.

Figure 4:
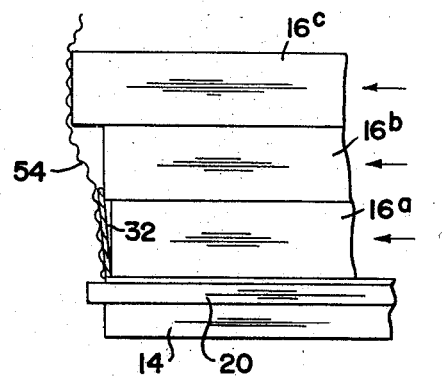
FIGURE 4 is a somewhat schematic and fragmentary elevational view of a forward-shifting load and a cross section of a portion of the bulkhead of the present invention; and, FIGURE 5 is an enlarged, fragmentary, elevational view of the preferred material for the body portion of the bulkhead of the present invention.
Figure 5:
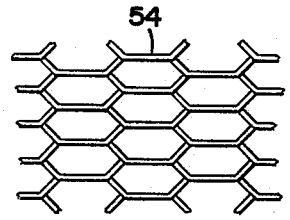

As shown in FIGURE 4, when the load 16 shifts forward, as for example caused by sudden stopping, a lowest cement slab 16a will strike against the base member 32. Depending upon the dimensions of a higher cement slab 16b, it may or may not strike the base member 32, and in the illustration shown, the cement slab 16b, just strikes the top of the base member 32. An uppermost cement slab 16c is too high to strike the base member 32 and therefore carries its impact against the body portion 54. The cement slab 16c may also strike one or more of the forward and diagonal reinforcement members 40–43 and 50, 51 depending upon its location and dimensions. As shown in FIGURE 4, the cement slab 16c bends and stretches the body portion 54 in the vicinity of impact but does not travel through the body portion 54 to strike or pass over the cab 11.

Over a period of time, if the body portion 52 becomes severely damaged due to frequent and excessive shifting of loads, the frame may be removed from the mountings 28, 29 and 44–47 to permit removal of the body portion 54 from the bottom of the frame. A new body portion may be inserted in the space between the front and rear portions of the frame. Also, damaged portions of the frame may be removed and replaced with ease.

As shown in FIGURE 1, if the load 16 is low enough, the driver may see through the body portion 54 to the rear of the truck. It can also be seen that the bulkhead 24 presents an additional frontal surface but has very low wind resistance due to the spaces in the expanded metal.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. In a load transporting truck having an enclosed cab including a rear wall and load supporting bed, a cab protecting bulkhead comprising:
   (a) a frame mounted on the bed at a location spaced rearwardly from said rear wall and extending upwardly from said bed between said rear wall and a load supporting portion of said bed;
   (b) the frame including members secured together and defining mounting spaces; and,
   (c) a body portion of screen material mounted on a frame and extending over said mounting spaces, said body yieldably resisting movement of a shifting load on said bed towards said cab to prevent the shifting load from striking said cab.
2. The bulkhead of claim 1 wherein the body portion is composed of expanded metal.
3. The bulkhead of claim 1 wherein the body portion is removably mounted on the frame.
4. The bulkhead of claim 1 wherein the frame is removably mounted on the bed.
5. The bulkhead of claim 1 wherein said body portion is interposed between said frame and a load on the bed whereby shifting forces of the load are distributed across said frame by said body portion when the load shifts to strike said body portion.
6. The bulkhead of claim 1 and further including first upwardly extending reinforcement members and second transversely extending reinforcement members extending between said base and top members, said body portion interposed between said upwardly extending reinforcement members and said transverse reinforcement members.
7. The bulkhead of claim 6 wherein said body portion and transverse reinforcement members are disposed rearwardly of said upwardly extending reinforcement members relative to a truck or trailer body.
8. A bulkhead for a truck or trailer bed comprising:
   (a) an upwardly extending frame mounted near a forward end of the bed;
   (b) the frame including spaced inwardly extending side members and spaced, horizontal base and top members forming a barrier area;
   (c) reinforcement members extending upwardly between said base and top members at spaced locations to form a mounting space;
   (d) a body portion of screen material attached to said frame in the mounting space; and,
   (e) structure detachably supporting said bulkhead on the bed comprising socket structures disposed at spaced locations on said bed for receiving ends of said side and reinforcement members.
9. The bulkhead of claim 8 wherein said body portion is comprised of expanded metal.
10. The bulkhead of claim 8 wherein said body portion is interposed between said frame and a load on the bed whereby shifting forces of the load are distributed across said frame by said body portion when the load shifts to strike said body portion.
11. The bulkhead of claim 8 and further including transversely extending reinforcement members extending between said base and top members, said body portion interposed between said upwardly extending reinforcement members and said transverse reinforcement members.
12. The bulkhead of claim 11 wherein said body portion and transverse reinforcement members are disposed rearwardly of said upwardly extending reinforcement members relative to a truck or trailer body.

13. In a tractor-trailer truck vehicle:
 (a) a tractor unit including an enclosed cab having a rear wall;
 (b) a trailer unit including a load carrying bed coupled to said tractor unit;
 (c) a bulkhead connected to the forward end of said bed and spaced from said cab;
 (d) said bulkhead comprising a framework of structurally rigid members and a yieldable screen member connecting said rigid members together; and,
 (e) said screen member and said rigid members effective to yieldably restrain a shifting load on said bed from striking said cab.

References Cited

UNITED STATES PATENTS

| | | | |
|---|---|---|---|
| 1,717,184 | 6/1929 | Browne | 296—36 X |
| 2,978,993 | 4/1961 | Hall | 105—374 |
| 3,047,161 | 7/1962 | Thacker | 280—150 X |

FOREIGN PATENTS

| | | |
|---|---|---|
| 511,561 | 8/1939 | Great Britain. |
| 530,521 | 12/1940 | Great Britain. |

LEO FRIAGLIA, Primary Examiner

JOHN A. PEKAR, Assistant Examiner

U.S. Cl. X.R.

105—374; 280—150; 296—43

PO-1050
(5/69)

UNITED STATES PATENT OFFICE
CERTIFICATE OF CORRECTION

Patent No. 3,493,263      Dated February 3, 1970

Inventor(s) William E. Brown

It is certified that error appears in the above-identified patent and that said Letters Patent are hereby corrected as shown below:

Column 4, line 47, delete "inwardly" and substitute --upwardly--

SIGNED AND
SEALED
JUL 21 1970

(SEAL)
Attest:

Edward M. Fletcher, Jr.
Attesting Officer

WILLIAM E. SCHUYLER, JR.
Commissioner of Patents